United States Patent
Oba et al.

(10) Patent No.: US 12,304,076 B2
(45) Date of Patent: May 20, 2025

(54) SETTING METHOD USING TEACHING OPERATION

(71) Applicant: DMG MORI CO., LTD., Nara (JP)

(72) Inventors: Yuta Oba, Nara (JP); Tsutomu Sakurai, Nara (JP); Hideki Nagasue, Nara (JP); Hideaki Tanaka, Nara (JP)

(73) Assignee: DMG MORI CO., LTD., Nara (JP)

( * ) Notice: Subject to any disclaimer, the term of this patent is extended or adjusted under 35 U.S.C. 154(b) by 234 days.

(21) Appl. No.: 18/035,675

(22) PCT Filed: Oct. 26, 2021

(86) PCT No.: PCT/JP2021/039468
§ 371 (c)(1),
(2) Date: May 5, 2023

(87) PCT Pub. No.: WO2022/097535
PCT Pub. Date: May 12, 2022

(65) Prior Publication Data
US 2023/0390924 A1    Dec. 7, 2023

(30) Foreign Application Priority Data
Nov. 5, 2020 (JP) ................. 2020-185017

(51) Int. Cl.
*B25J 9/16* (2006.01)
(52) U.S. Cl.
CPC .................... *B25J 9/163* (2013.01)
(58) Field of Classification Search
CPC ........................................... B25J 9/163
See application file for complete search history.

(56) References Cited

U.S. PATENT DOCUMENTS

2019/0077016 A1\* 3/2019 Atohira ............... G05B 19/182
2019/0246858 A1    8/2019 Karasikov et al.

FOREIGN PATENT DOCUMENTS

| JP | S63120088 A | 5/1988 |
| JP | H10240323 A | 9/1998 |

(Continued)

OTHER PUBLICATIONS

Mobile Cobots—(6 axis arms mounted on AGVs. (n.d.). Universal Robots. https://video.universal-robots.com/mobile-cobots-6-axis-arms-mounted-1. Nov. 2020). (Year: 2020).\*

(Continued)

*Primary Examiner* — Jaime Figueroa
*Assistant Examiner* — Jerrod Irvin Davis
(74) *Attorney, Agent, or Firm* — von Briesen & Roper, s.c.

(57) ABSTRACT

In a system (1) including a robot (25), a transportation device (35) moving with the robot (25) mounted thereon, and a controller, an operating pose of the robot (25) and an operation position of the transportation device (35) in a three-dimensional space formed by first, second, and third axes orthogonal to one another are set by a teaching operation. The transportation device (35) is moved to a predetermined operation position and this operation position is stored as a provisional operation position, and the robot (25) is brought into a predetermined operating pose and this operating pose is stored as a provisional operating pose. Subsequently, an acting part (29) of the robot (25) is moved along the first axis and the second axis to confirm whether movable amounts of the acting part (29) exceed positioning error amounts in the same directions of the transportation device (35). When both of the movable amounts exceed the positioning error amounts, the provisional operation position (Continued)

is set as a target operation position and the provisional operating pose is set as a target operating pose.

5 Claims, 8 Drawing Sheets

(56) References Cited

FOREIGN PATENT DOCUMENTS

| JP | H11226887 A | 8/1999 |
|----|-------------|--------|
| JP | 2016221622 A | 12/2016 |
| JP | 2017132002 A | 8/2017 |

OTHER PUBLICATIONS

International Search Report for related Application No. PCT/JP2021/039468; report dated Jan. 25, 2022.

* cited by examiner

SETTING METHOD USING TEACHING OPERATION

TECHNICAL FIELD

The present invention relates to a method of setting an operating pose of a robot and a moving position of a transportation device by a teaching operation in a system including the robot that has an acting part acting on a target object, the transportation device that has the robot mounted thereon and moves to a predetermined operation position, and a controller that controls operations of the robot and transportation device.

BACKGROUND ART

A known example of the system as mentioned above is disclosed in Japanese Unexamined Patent Application Publication No. 2017-132002 (Patent Literature 1). This system is configured such that an automatic guided vehicle (transportation device) having a robot mounted thereon moves to an operation position set with respect to a machine tool and the robot performs operations, such as attachment and removal of a workpiece, with respect to the machine tool at the operation position.

Such a system enables a single robot which is moved by an automatic guided vehicle to perform operations, such as attachment and removal of a workpiece, with respect to more than one machine tool. Therefore, as compared with a system in which a robot is arranged in a fixed manner with respect to a machine tool, the degree of freedom in machine tool layout is increased so that a machine tool layout which provides enhanced production efficiency is possible. Further, since it is possible to cause a single robot to perform operations with respect to many machine tools, the equipment cost is reduced as compared with the conventional system in which the robot is arranged in a fixed manner.

However, because the automatic guided vehicle is configured to move itself by means of wheels, the automatic guided vehicle cannot always be stopped at the operation position with high positioning accuracy. Therefore, in order that the robot accurately performs operations with respect to the machine tool, it is necessary to compare the operating pose into which the robot is actually brought when the automatic guided vehicle is positioned at the operation position with a reference operating pose of the robot that is set in the so-called teaching operation and serves as a reference for control, detect an amount of error between them, and compensate the operating pose of the robot based on the detected amount of error.

A known technique for such compensation of the operating pose of the robot is disclosed as a position compensation method in Japanese Unexamined Patent Application Publication No. 2016-221622 (Patent Literature 2). Specifically, this position compensation method is configured such that a visual target consisting of two calibration markers is arranged on an outer surface of the machine tool, images of the visual target are captured by a camera arranged on a movable part of the robot, a relative positional relation between the robot and the machine tool is measured based on the captured images and the position and pose of the camera, and the operating pose of the robot is compensated based on the measured positional relation.

CITATION LIST

Patent Literature

Patent Literature 1: Japanese Unexamined Patent Application Publication No. 2017-132002

Patent Literature 2: Japanese Unexamined Patent Application Publication No. 2016-221622

SUMMARY OF INVENTION

Technical Problem

For example, in the case where the robot is composed of an articulated robot, the position of the acting part (end effector) arranged on the distal end of the robot arm is defined by accumulation of the postures of the arms that are moved by rotation of the motors forming the arm joints. Each motor is rotatable only within a limited angular range because of its structure. Therefore, depending on the postures of the arms, the acting part cannot be moved any further in a certain direction. That is to say, the robot has singularities. For example, when the arms are positioned in a straight line, the acting part cannot be moved in the extending direction. Further, when two or more movable axes are positioned in a straight line, the acting part cannot be moved in some directions.

Accordingly, compensation of the operating pose into which the robot is brought when the automatic guided vehicle is positioned at the operation position in an automatic operation is impossible if the amount of positioning error of the automatic guided vehicle exceeds the movable range of the acting part that is limited by the singularities. Consequently, the system is brought into an alarm state and shut down.

This is more specifically described on the basis of FIGS. 9 and 10. In FIGS. 9 and 10, the automatic guided vehicle is to be moved in an X-axis and Y-axis plane. Pt indicates a taught position (target position) of the distal end of the acting part of the robot (robot end) on a plane parallel to the X-axis and Y-axis plane, which is set with the automatic guided vehicle positioned at the operation position in a teaching operation. Pa indicates the position (actual operating position) of the robot end on the plane parallel to the X-axis and Y-axis plane with the automatic guided vehicle positioned at the operation position in an automatic operation. Further, $\Delta Xe$, $\Delta Ye$ indicate positioning error amounts of the automatic guided vehicle, and Xc, Yc respectively indicate movable distances in the X-axis direction and the Y-axis direction of the robot end with respect to the actual operating position Pa.

For example, as shown in FIG. 9, when both of the positioning error amounts $\Delta Xe$, $\Delta Ye$ of the automatic guided vehicle are smaller than the movable distances Xc, Yc in the X-axis direction and the Y-axis direction of the robot end with respect to the actual operating position Pa, i.e., when the target position Pt as a position to which the robot end has to be moved by compensation is situated within the movable area of the robot end that is indicated by the dashed and double-dotted lines, the actual operating position Pa of the robot end can be compensated to the target position Pt (refer to the broken-line arrow).

On the other hand, as shown in FIG. 10, when at least one of the positioning error amounts $\Delta Xe$, $\Delta Ye$ of the automatic guided vehicle exceeds a corresponding one of the movable distances Xc, Yc in the X-axis direction and the Y-axis direction of the robot end with respect to the actual operating position Pa (FIG. 10 shows the case of $\Delta Xe > Xc$), i.e., when the target position Pt as a position to which the robot end has to be moved by compensation is situated out of the movable area of the robot end that is indicated by the dashed and double-dotted lines, the actual operating position Pa of the robot end cannot be compensated to the target position Pt (refer to the broken-line arrow).

When the system has been brought into the alarm state and shut down, it is necessary to return the automatic guided vehicle and the robot to their respective initial positions before resuming the system. Further, if the system is frequently brought into the alarm state, it is necessary to take measures such as resetting the operating pose of the robot and the moving position of the transportation device by the teaching operation. Taking such measures reduces the availability of the system.

The present invention has been achieved in view of the above-described circumstances, and an object of the invention is to provide a method of setting a pose of a robot by a teaching operation such that an actual operating position of the robot end is reliably compensated to a target position set in the teaching operation.

Solution to Problem

To solve the above-described problem, the present invention provides a setting method of setting a target operating pose of a robot and a target operation position of a transportation device in a three-dimensional space by a manual teaching operation in a robot system, the robot system including: the robot having an acting part acting on a target object; the transportation device having the robot mounted thereon and moving to a set operation position; and a controller controlling operations of the robot and transportation device, the three-dimensional space being formed by a first axis, a second axis, and a third axis, the first axis and the second axis being orthogonal to each other in a horizontal plane, the third axis extending vertically and being orthogonal to the first axis and the second axis, the setting method including in sequence:
a first step of moving the transportation device to a position to be set as a predetermined operation position in a plane formed by the first axis and the second axis, and then storing the operation position as a provisional operation position;
a second step of operating the robot in the three-dimensional space with the transportation device stopped at the operation position to bring the robot into a predetermined operating pose, and then storing the operating pose as a provisional operating pose;
a third step of moving the acting part along the first axis and along the second axis by changing a pose of the robot with the transportation device at the provisional operation position and the robot in the provisional operating pose to confirm whether movable amounts in the first axis direction and the second axis direction of the acting part exceed previously obtained positioning error amounts in the first axis and the second axis of the transportation device; and
a fourth step of, when both of the movable amounts in the first axis direction and the second axis direction of the acting part exceed the positioning error amounts in the first axis and the second axis of the transportation device, storing the provisional operation position as the target operation position and storing the provisional operating pose as the target operating pose.

In setting a target operating pose of the robot and a target operation position of the transportation device by a manual teaching operation in accordance with the setting method according to the present invention, the above-described first through fourth steps are performed in sequence.

First, in the first step, the transportation device is moved to a position to be set as a predetermined operation position in a plane formed by the first axis and the second axis and then this operation position is stored as a provisional operation position. Subsequently, in the second step, the robot is brought into a predetermined operating pose in the three-dimensional space and then this operating pose is stored as a provisional operating pose.

Subsequently, in the third step, the acting part of the robot is moved along the first axis and along the second axis to confirm whether movable amounts in the first axis direction and the second axis direction of the acting part exceed previously obtained positioning error amounts in the first axis and the second axis of the transportation device. Subsequently, in the fourth step, when both of the movable amounts in the first axis direction and the second axis direction of the acting part exceed the positioning error amounts in the first axis and the second axis of the transportation device, the provisional operation position is stored as a target operation position and the provisional operating pose is stored as a target operating pose.

The thus-obtained target operating pose of the robot allows the position of the acting part of the robot to be moved beyond the positioning error amounts in the first axis and the second axis of the transportation device. In other words, even if positioning errors occur in the first axis and the second axis when the transportation device is moved to the target operation position in an automatic operation, it is possible to move the acting part by compensation amounts in the first axis direction and the second axis direction set based on the positioning errors when bringing the robot into the target operating pose. That is to say, it is possible to reliably compensate the actual operating pose of the robot to the target operating pose based on the positioning errors of the transportation device.

Note that it is preferred that the first axis and the second axis are set in a horizontal plane. However, the first axis and the second axis are not limited to being set in a horizontal plane but only need to be set in a predetermined plane. Further, it is preferred that the first axis and the second axis are orthogonal to each other. However, the first axis and the second axis are not limited to being orthogonal to each other but only need to intersect each other. Furthermore, it is preferred that the third axis is set vertically and orthogonal to the first axis and the second axis. However, the third axis only needs to intersect the first axis and the second axis and does not need to be set vertically.

Further, the setting method according to the present invention may be configured such that when either one of the movable amounts in the first axis direction and the second axis direction does not exceed a corresponding one of the positioning error amounts in the first axis and the second axis in the fourth step,
after the fourth step, a correction step of rotating the robot as a whole by a predetermined angle about the third axis is performed, and
thereafter, the second through fourth steps are re-performed in sequence.

Further, the setting method according to the present invention may be configured such that the above-described first through fourth steps are performed anew independently of the previous performance when either one of the movable amounts in the first axis direction and the second axis direction does not exceed a corresponding one of the positioning error amounts in the first axis and the second axis in the fourth step. However, instead of performing the first through fourth steps anew, the setting method may be configured such that:

after the fourth step, a correction step of moving the transportation device by a distance greater than an amount of insufficiency in the axis direction the movable amount in which does not exceed the corresponding positioning error amount is performed, and thereafter, the second through fourth steps are re-performed in sequence.

Further, the setting method according to the present invention may be configured such that:

when either one of the movable amounts in the first axis direction and the second axis direction does not exceed a corresponding one of the positioning error amounts in the first axis and the second axis in the fourth step, after the fourth step, a first correction step of rotating the robot as a whole by a predetermined angle about the third axis is performed, and thereafter, the second through fourth steps are re-performed in sequence; and when either one of the movable amounts in the first axis direction and the second axis direction does not exceed a corresponding one of the positioning error amounts in the first axis and the second axis in the re-performed fourth step, after the re-performed fourth step, a second correction step of moving the transportation device by a distance greater than an amount of insufficiency in the axis direction the movable amount in which does not exceed the corresponding positioning error amount is performed, and thereafter, the second through fourth steps are re-performed in sequence again.

Advantageous Effects of Invention

As described above, with the setting method according to the present invention, even if positioning errors occur in the first axis and the second axis when the transportation device is moved to the target operation position in an automatic operation, it is possible to move the acting part by compensation amounts in the first axis direction and the second axis direction set based on the positioning errors when bringing the robot into the target operating pose. That is to say, it is possible to reliably compensate the actual operating pose of the robot in the automatic operation to the target operating pose based on the positioning errors of the transportation device.

DESCRIPTION OF EMBODIMENTS

Hereinafter, a specific embodiment of the present invention will be described with reference to the drawings.

Figure 1:
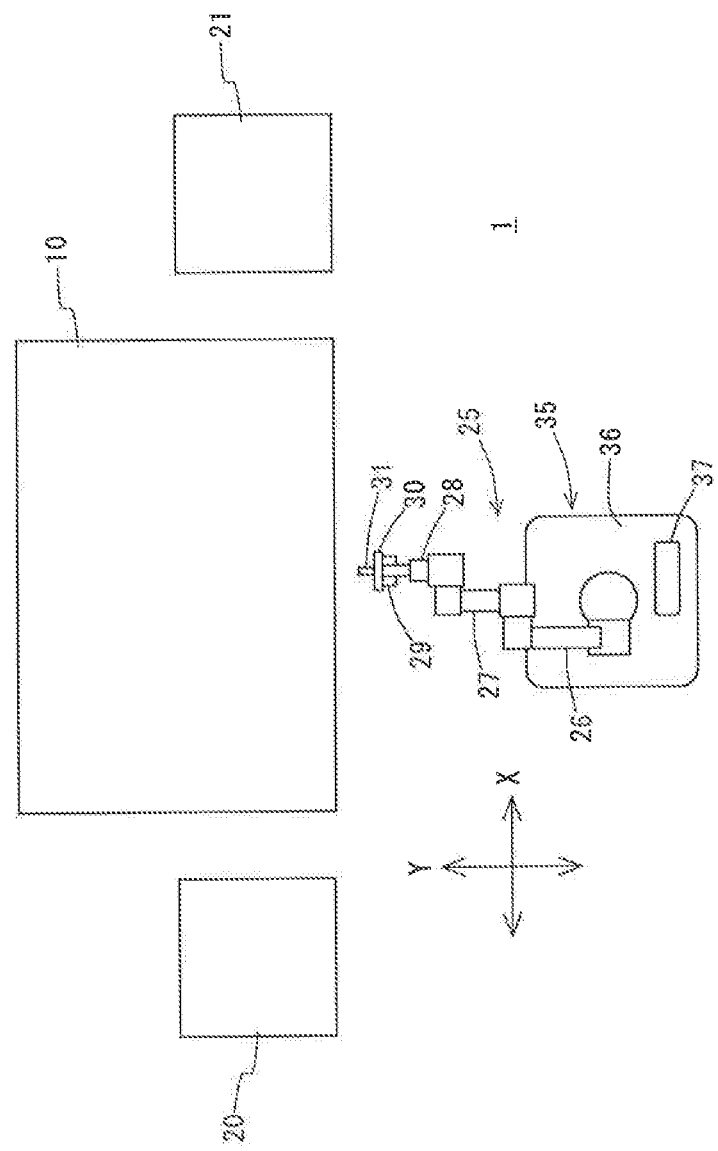
FIG. 1 is a plan view schematically illustrating a structure of a system according to an embodiment of the present invention.
Figure 2:
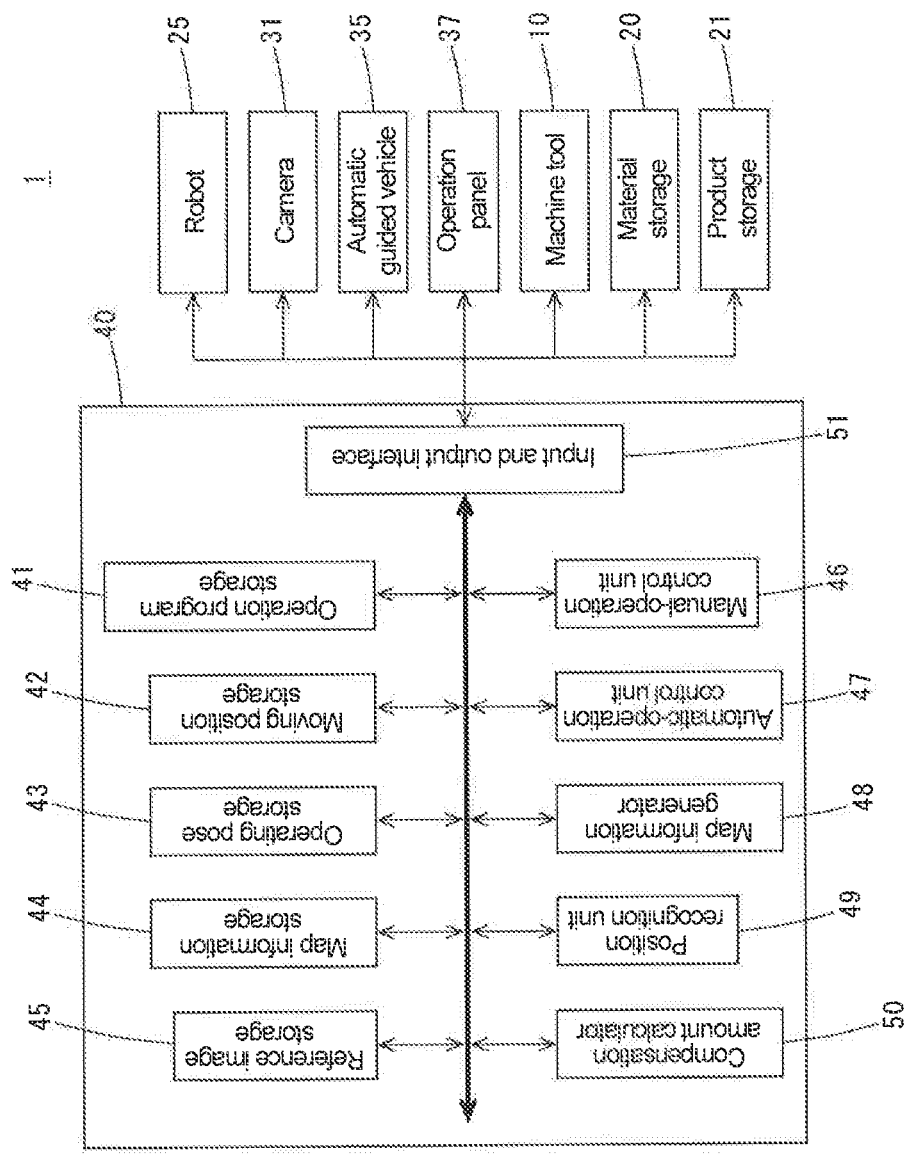
FIG. 2 is a block diagram illustrating a configuration of the system according to the embodiment.

As illustrated in FIGS. 1 and 2, a system 1 according to this embodiment includes a machine tool 10, a material storage 20 and a product storage 21 as peripheral devices, an automatic guided vehicle (AGV) 35, a robot 25 mounted on the automatic guided vehicle 35, a camera 31 attached to the robot 25, and a controller 40 controlling the robot 25 and the automatic guided vehicle 35.

Figure 4:
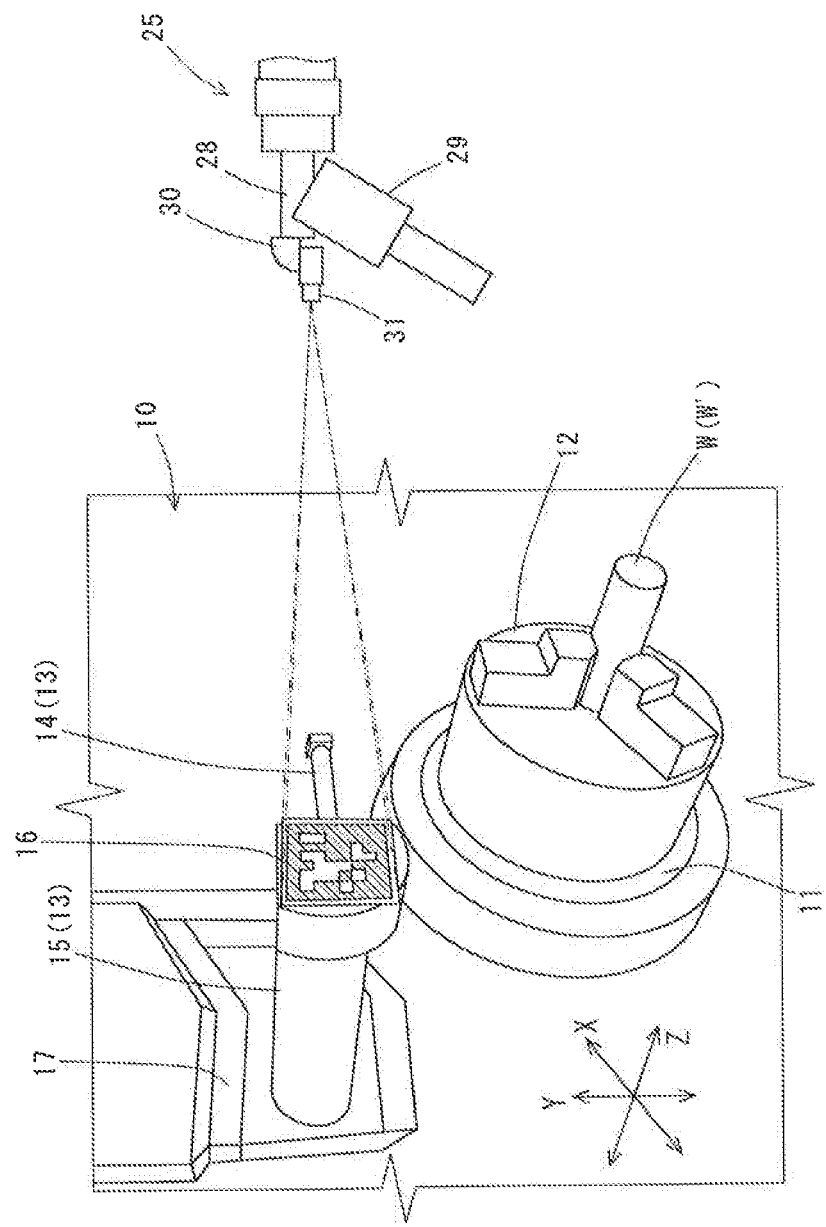
FIG. 4 is an illustrative diagram for explaining an image capturing pose of the robot in the embodiment.
Figure 5:
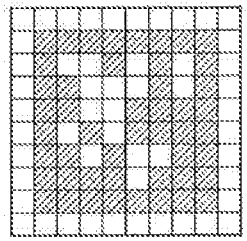
FIG. 5 is an illustrative diagram of an identification figure in the embodiment.

As illustrated in FIG. 4, the machine tool 10 is a typical NC (numerically-controlled) vertical lathe that has a vertically arranged spindle 11, to which a chuck 12 for clamping a workpiece W (W') is attached, and performs turning on the workpiece W (W'). The machine tool 10 has a tool presetter 13 arranged in the vicinity of the spindle 11. The tool presetter 13 has a contactor 14 and a support bar 15 supporting the contactor 14. The support bar 15 is movable into and out of a machining area along an axis of the spindle 11 and has a display board 16, which is made of, for example, ceramics, arranged on an end surface thereof located on the machining area side. The display board 16 has an identification figure, as illustrated in FIG. 5, drawn thereon.

Note that the display board 16 is arranged to be on a horizontal plane. FIG. 4 shows a state where the support bar 15 and the contactor 14 have been moved into the machining area. After the support bar 15 and the contactor 14 are moved out of the machining area so that the contactor 14 and the display board 16 are retracted into a storage area, a shutter 17 is closed so that the contactor 14 and the display board 16 are isolated from the machining area.

The identification figure in this example has a matrix structure having a plurality of square pixels arranged two-dimensionally, and each pixel is displayed in white or black. In FIG. 5, the pixels displayed in black are hatched. Examples of the identification figure include an AR marker and an April Tag. Further, where a small identification figure is used, suitable measures, e.g., arranging a lens over the identification figure, may be taken to enable the camera 31, which is described later, to capture an enlarged image of the identification figure.

The material storage 20 is disposed on the left on the machine tool 10 in FIG. 1. The material storage 20 stores materials (unmachined workpieces W) to be machined in the machine tool 10. The product storage 21 is disposed on the right of the machine tool 10 in FIG. 1. The product storage 21 stores products or semi-finished products (machined workpieces W') machined in the machine tool 10.

As illustrated in FIG. 1, the automatic guided vehicle 35 has a mount surface 36 as its top surface, on which the robot 25 is mounted. Further, the automatic guided vehicle 35 has an operation panel 37 attached thereto, which can be carried around by an operator. The operation panel 37 has an input and output unit for input and output of data, an operation unit for manual operation of the automatic guided vehicle 35 and robot 25, and a display capable of displaying a picture thereon.

Further, the automatic guided vehicle 35 has a sensor (for example, a distance measurement sensor using a laser beam) which enables recognition of the position of the automatic guided vehicle 35 in a plant, and the automatic guided vehicle 35 is configured to travel tracklessly in a horizontal X-axis and Y-axis plane under control by the controller 40 in the plant including the area where the machine tool 10, the material storage 20, and the product storage 21 are disposed. The automatic guided vehicle 35 in this embodiment moves to operation positions respectively set with respect to the machine tool 10, the material storage 20, and the product storage 21.

Figure 3:
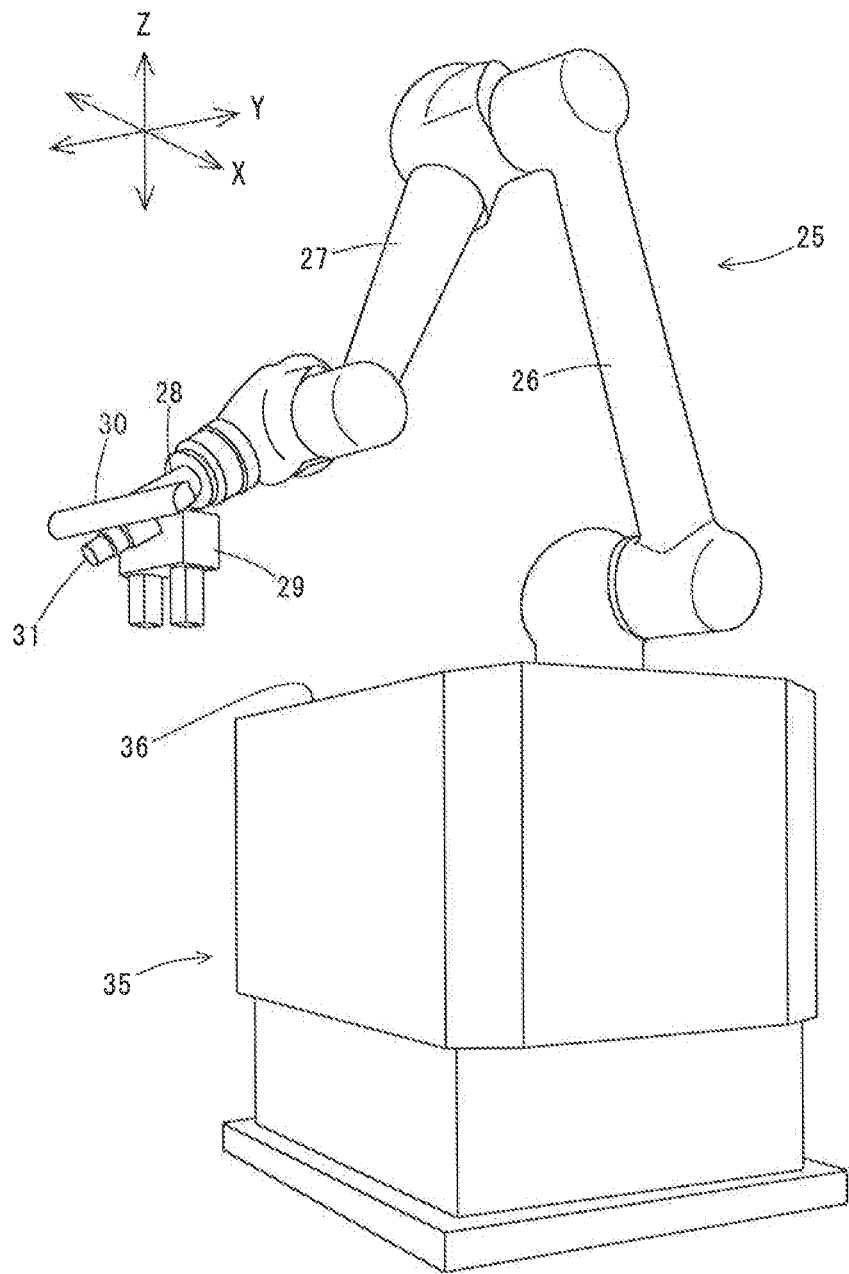
FIG. 3 is a perspective view illustrating an automatic guided vehicle and a robot according to the embodiment.

As illustrated in FIGS. 1 and 3, the robot 25 is an articulated robot that has three arms, namely, a first arm 26, a second arm 27, and a third arm 28. The third arm 28 has a hand 29 as an end effector (acting part) attached to the distal end thereof, and also has one camera 31 attached to the distal end thereof via a support bar 30. The robot 25 moves the hand 29 and the camera 31 in a three-dimensional space defined by the horizontal X-axis and Y-axis and a vertical Z-axis orthogonal to the X-axis and the Y-axis.

As illustrated in FIG. 2, the controller 40 consists of an operation program storage 41, a moving position storage 42, an operating pose storage 43, a map information storage 44, a reference image storage 45, a manual-operation control unit 46, an automatic-operation control unit 47, a map information generator 48, a position recognition unit 49, a compensation amount calculator 50, and an input and output interface 51. The controller 40 is connected to the machine tool 10, the material storage 20, the product storage 21, the robot 25, the camera 31, the automatic guided vehicle 35, and the operation panel 37 via the input and output interface 51.

Note that the controller 40 is composed of a computer including a CPU, a RAM, and a ROM. The manual-operation control unit 46, the automatic-operation control unit 47, the map information generator 48, the position recognition unit 49, the compensation amount calculator 50, and the input and output interface 51 are functionally implemented by a computer program to carry out the processes described later. The operation program storage 41, the moving position storage 42, the operating pose storage 43, the map information storage 44, and the reference image storage 45 are composed of an appropriate storage medium, e.g., a RAM. In this embodiment, the controller 40 is attached to the automatic guided vehicle 35, and is connected to the machine tool 10, the material storage 20, and the product storage 21 through appropriate communication means and connected to the robot 25, the camera 31, the automatic guided vehicle 35, and the operation panel 37 by wire or wirelessly. However, the controller 40 is not limited to this configuration and may be disposed at an appropriate position other than the automatic guided vehicle 35. In such a case, the controller 40 is connected to the above-mentioned elements through appropriate communication means.

The operation program storage 41 is a functional unit that stores an automatic-operation program for causing the automatic guided vehicle 35 and the robot 25 to automatically operate during production and stores a map generation program for causing the automatic guided vehicle 35 to operate during generation of map information of the plant, which is described later. The automatic-operation program and the map generation program are stored into the operation program storage 41, for example, by being input through the input and output unit of the operation panel 37.

The automatic-operation program contains command codes regarding a moving position as a target position to which the automatic guided vehicle 35 is to be moved, a moving speed of the automatic guided vehicle 35, and an orientation of the automatic guided vehicle 35. The automatic-operation program further contains command codes regarding operations to be carried out in sequence by the robot 25 and command codes regarding operations of the camera 31. The map generation program contains command codes for causing the automatic guided vehicle 35 to travel tracklessly all over the plant to cause the map information generator 48 to generate map information.

The map information storage 44 is a functional unit that stores map information including information on arrangement of machines, devices, instruments, etc. (hereinafter, collectively referred to as "devices") arranged in the plant where the automatic guided vehicle 35 travels. The map information is generated by the map information generator 48.

The map information generator 48 obtains spatial information of the plant from distance data detected by the sensor when the automatic guided vehicle 35 is caused to travel in accordance with the map generation program stored in the operation program storage 41 under control by the automatic-operation control unit 47, which is described in detail later, of the controller 40. The map information generator 48 also recognizes planar shapes of the devices arranged in the plant, and, for example, based on previously registered planar shapes of the devices, recognizes the positions, planar shapes, etc. of particular devices (in this example, the machine tool 10, the material storage 20, and the product storage 21) arranged in the plant (arrangement information). The map information generator 48 stores the obtained spatial information and arrangement information as map information of the plant into the map information storage 44.

The moving position storage 42 is a functional unit that stores specific moving positions. The moving positions are specific target positions to which the automatic guided vehicle 35 is to be moved, and correspond to the command codes contained in the operation program. The moving positions include the above-mentioned operation positions (target operation positions) set with respect to the machine tool 10, the material storage 20, and the product storage 21. Note that the moving positions (target operation positions) are set, for example, as follows: the automatic guided vehicle 35 is manually operated through the operation panel 37 so that it is moved to each targeted position under control by the manual-operation control unit 46, and position data recognized by the position recognition unit 49 at each targeted position is stored into the moving position storage 42. This operation is generally called "teaching operation".

The operating pose storage 43 is a functional unit that stores data regarding poses (operating poses) of the robot 25, into which the robot 25 is brought in sequence when it is operated in a predetermined sequence. The operating poses correspond to the command codes contained in the operation program. This operating pose data is composed of rotational angle data of joints (motors) of the robot 25 in each targeted pose. This rotational angle data is obtained by, in the teaching operation using the operation panel 37, manually operating the robot 25 to bring the robot 25 into each targeted pose under control by the manual-operation control unit 46. The obtained rotational angle data is stored as operating pose data into the operating pose storage 43.

Specific operating poses of the robot 25 are set with respect to each of the material storage 20, machine tool 10, and product storage 21. For example, a set of extraction poses (target operating poses) is set with respect to the material storage 20. The set of extraction poses consists of an operation starting pose for starting an operation with respect to the material storage 20 (extraction starting pose), operating poses for causing the hand 29 to grip an unmachined workpiece W stored in the material storage 20 and extract the unmachined workpiece W from the material storage 20 (extracting poses), and a pose for finishing the extraction (extraction finishing pose; in this embodiment, this pose is identical to the extraction starting pose).

A set of workpiece-removal poses as target operating poses for removing a machined workpiece W' from the machine tool 10 and a set of workpiece-attachment poses as target operating poses for attaching an unmachined workpiece W to the machine tool 10 are set with respect to the machine tool 10.

Specifically, the set of workpiece-removal poses consists of, for example, the following target operating poses: an operation starting pose preceding insertion into the machine tool 10; a pose for moving the hand 29 and the camera 31 into the machining area of the machine tool 10, positioning the camera 31 directly opposite the identification figure arranged on the support bar 15, and causing the camera 31 to capture an image of the identification figure (image capturing pose; see FIG. 4); a pose for positioning the hand 29 opposite a machined workpiece W' clamped by the chuck 12 of the machine tool 10 (removal preparing pose); a pose for moving the hand 29 toward the chuck 12 and causing the hand 29 to grip the machined workpiece W' clamped by the chuck 12 (gripping pose); a pose for moving the hand 29 away from the chuck 12 to pull the machined workpiece W' from the chuck 12 (pulling pose); and a pose for moving the hand 29 and the camera 31 out of the machine tool 10 (operation finishing pose). Note that the camera 31 as positioned directly opposite the identification figure arranged horizontally is in a pose such that a lens of the camera 31 is substantially parallel to the identification figure.

The set of workpiece-attachment poses consists of, for example, the following target operating poses: an operation starting pose preceding insertion into the machine tool 10; a pose for moving the hand 29 and the camera 31 into the machining area of the machine tool 10, positioning the camera 31 directly opposite the identification figure arranged on the support bar 15, and causing the camera 31 to capture an image of the identification figure (image capturing pose; see FIG. 4); a pose for positioning a unmachined workpiece W gripped by the hand 29 opposite the chuck 12 of the machine tool 10 (attachment preparing pose); a pose for moving the hand 29 toward the chuck 12 to allow the chuck 12 to clamp the unmachined workpiece W (attaching pose); a pose for moving the hand 29 away from the chuck 12 (moving-away pose); and a pose for moving the hand 29 and the camera 31 out of the machine tool 10 (operation finishing pose).

A set of storage poses (target operating poses) is set with respect to the product storage 21. The set of storage poses consists of an operation starting pose for starting an operation with respect to the product storage 21 (storage starting pose), operating poses for storing a machined workpiece W' gripped by the hand 29 into the product storage 21 (storing poses), and a pose for finishing the storage (storage finishing pose; in this embodiment, this pose is identical to the storage starting pose).

The position recognition unit 49 is a functional unit that recognizes the position of the automatic guided vehicle 35 in the plant based on distance data detected by the sensor and the map information of the plant stored in the map information storage 44 and recognizes the position of the hand 29 as an end effector and the position of the camera 31 in the three-dimensional space based on rotational angles of the motors arranged on the joints of the robot 25. Based on the position of the automatic guided vehicle 35 recognized by the position recognition unit 49, the automatic-operation control unit 47 controls operation of the automatic guided vehicle 35. The positions recognized by the position recognition unit 49, i.e., the recognized position in the X-axis and Y-axis plane of the automatic guided vehicle 35 and the recognized positions in the three-dimensional space (defined by the X-axis, the Y-axis, and the Z-axis) of the hand 29 and camera 31, are displayed on the display of the operation panel 37. Note that the positions in the three-dimensional space of the hand 29 and camera 31 can be calculated by a predetermined transformation based on the lengths of the arms of the robot 25 and the rotational angles of the motors arranged on the joints of the robot 25.

The manual-operation control unit 46 is a functional unit that operates the automatic guided vehicle 35, the robot 25, and the camera 31 in accordance with operation signals input through the operation panel 37 by an operator. That is to say, under control by the manual-operation control unit 46, an operator can translate the automatic guided vehicle 35 along the X-axis and the Y-axis and capture an image with the camera 31 through the operation panel 37 while checking the position of the automatic guided vehicle 35 and the positions in the three-dimensional space of the hand 29 and camera 31 that are recognized by the position recognition unit 49 and displayed on the display. The operator also can translate the hand 29 and camera 31 of the robot 25 along the X-axis, the Y-axis, and the Z-axis and rotate the hand 29 and camera 31 of the robot 25 about the X-axis, the Y-axis, and the Z-axis. Note that the rotations about the X-axis, the Y-axis, and the Z-axis are represented by rx, ry, and rz, respectively.

The automatic-operation control unit 47 is a functional unit that operates the automatic guided vehicle 35, the robot 25, and the camera 31 in accordance with the automatic-operation program or map generation program stored in the operation program storage 41. In this process, the data stored in the moving position storage 42 and the operating pose storage 43 are used as necessary.

The reference image storage 45 is a functional unit that stores, as a reference image, an image obtained by, in the teaching operation, causing the camera 31 to capture an image of the identification figure arranged on the support bar 15 of the tool presetter 13 when the automatic guided vehicle 35 is positioned at the operation position set with respect to the machine tool 10 and the robot 25 is in the image capturing pose.

When the robot 25 is automatically operating in accordance with the automatic-operation program stored in the operation program storage 41 under control by the automatic-operation control unit 47, once an image of the identification figure is captured by the camera 31 with the robot 25 in the image capturing pose, the compensation amount calculator 50 estimates, based on the current image of the identification figure captured in this automatic operation and the reference image (image captured in the teaching operation) stored in the reference image storage 45, positional error amounts ($\Delta x$, $\Delta y$) of the camera 31 in two orthogonal axis directions set in a plane parallel to the identification figure (in this embodiment, the X-axis direction and the Y-axis direction) and a rotational error amount ($\Delta rz$) of the camera 31 about a vertical axis orthogonal to the plane (in this embodiment, the Z-axis) between the current pose (actual operating pose) of the robot 25 and the pose (target operating pose) of the robot 25 in the teaching operation. Based on the estimated error amounts, the compensation amount calculator 50 calculates compensation amounts for the acting part (corresponding to the hand 29 or the camera 31) in the actual operating pose of the robot 25.

The automatic-operation control unit 47 compensates, based on the compensation amounts calculated by the compensation amount calculator 50, the position (target position) of the hand 29 of the robot 25 in each of the operating poses of the robot 25 for performing the operation with respect to the machine tool 10, i.e., the removal preparing pose, gripping pose, and pulling pose of the set of workpiece-removal poses or the attachment preparing pose, attaching pose, and moving-away pose of the set of workpiece-attachment poses. Note that the compensation amounts are transformed into angle data for the joints of the robot 25 by a preset transformation, so that the robot 25 is controlled in accordance with the angle data.

In the system 1 according to this embodiment having the above-described configuration, the teaching operation is first carried out, whereby the operation positions (target operation positions) of the automatic guided vehicle 35 with respect to the machine tool 10, the material storage 20, and the product storage 21 and the operating poses (target operating poses) of the robot 25 with respect to the machine tool 10, the material storage 20, and the product storage 21 are set and the set operation positions and operating poses are respectively stored into the moving position storage 42 and the operating pose storage 43.

A specific setting method is described with the machine tool 10 as an example. First, the automatic guided vehicle 35 is manually moved to the operation position with respect to the machine tool 10 and this position is stored as the operation position (target operation position) of the automatic guided vehicle 35 with respect to the machine tool 10 into the moving position storage 42. Subsequently, the robot 25 is manually operated and brought into the operation starting pose (serving also as the operation finishing pose) and the image capturing pose that are common to the workpiece removal and the workpiece attachment, and data on each operating pose (target operating pose) is stored into the operating pose storage 43. Further, the robot 25 is brought into the removal preparing pose, gripping pose, and pulling pose for the workpiece removal and into the attachment preparing pose, attaching pose, moving-away pose for the workpiece attachment, and data on each operating pose (target operating pose) is stored into the operating pose storage 43.

Figure 6:
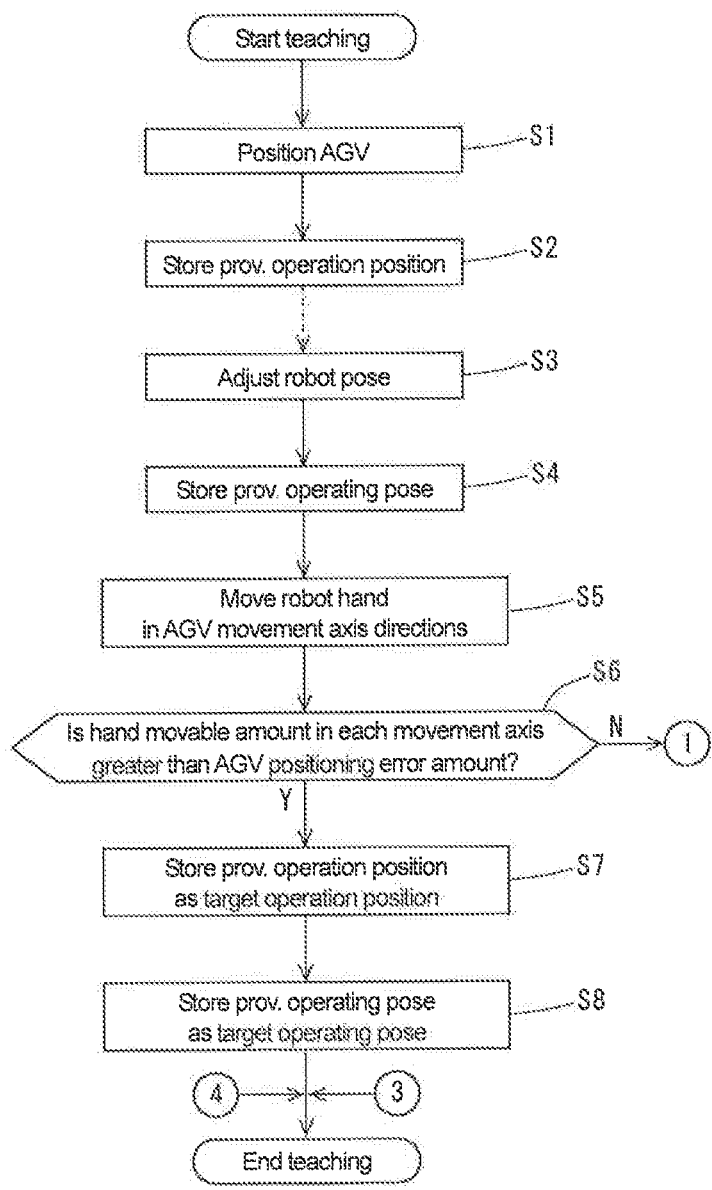
FIG. 6 is a flowchart showing a procedure of a setting method according to the embodiment.
Figure 7:
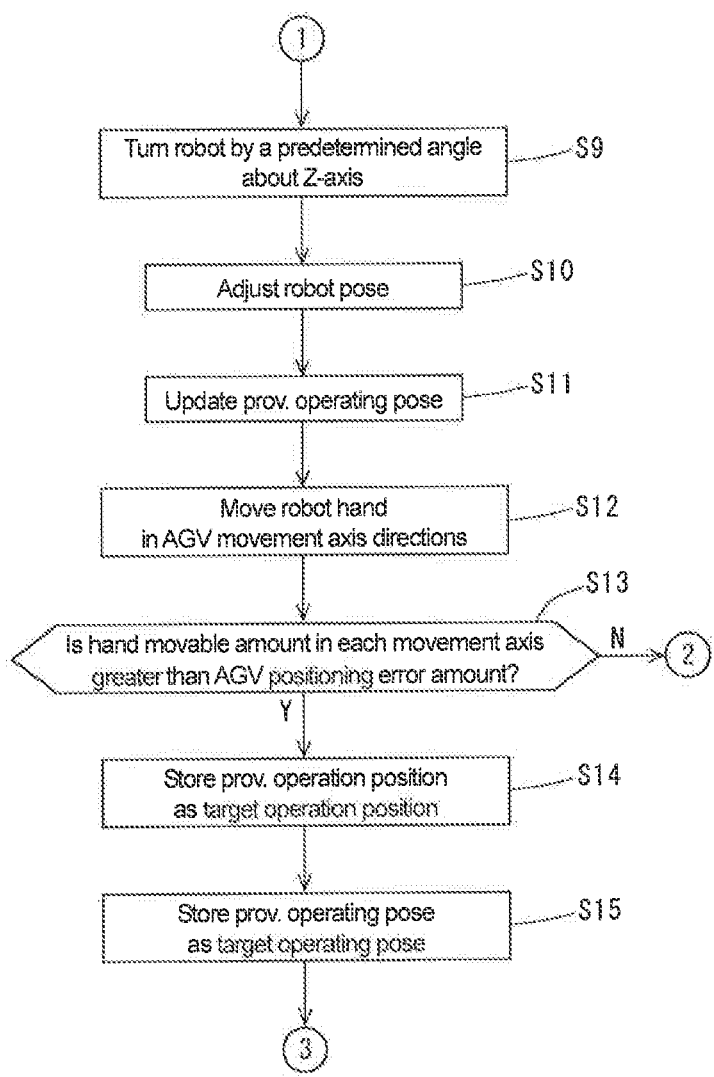
FIG. 7 is a flowchart showing the procedure of the setting method according to the embodiment.
Figure 8:
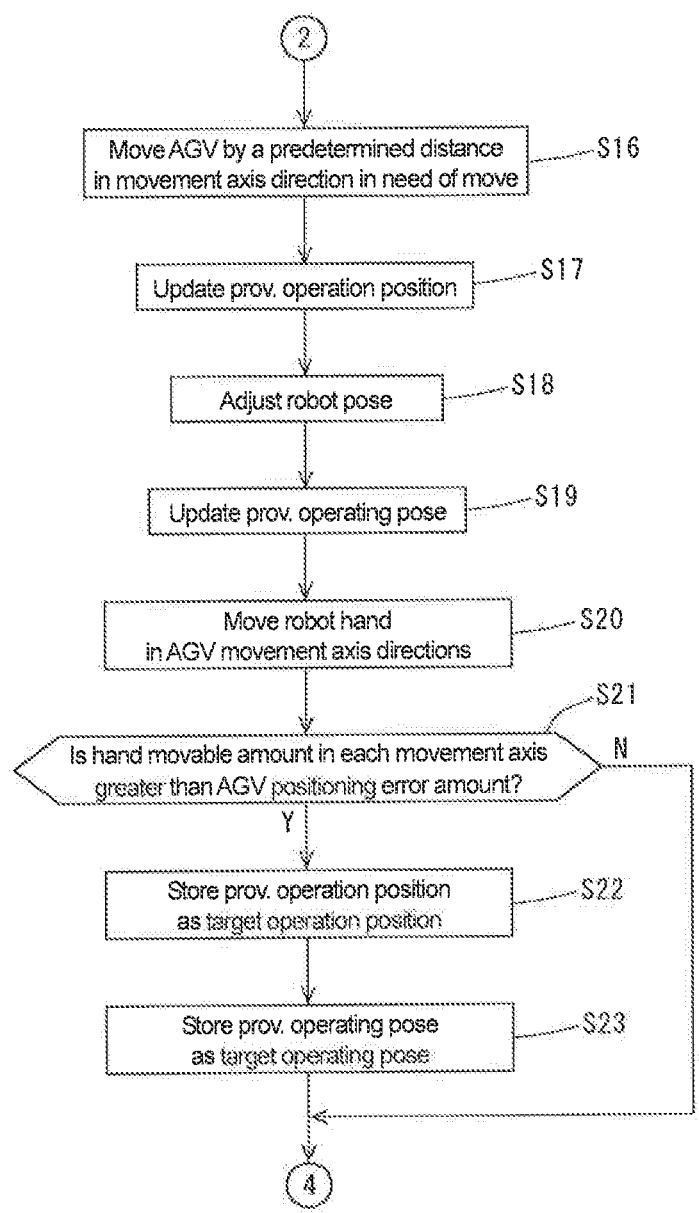
FIG. 8 is a flowchart showing the procedure of the setting method according to the embodiment.

In this process, the operating poses (target operating poses) the position of the hand 29 in which is to be compensated based on compensation amounts calculated by the compensation amount calculator 50, namely, the removal preparing pose, gripping pose, and pulling pose of the set of workpiece-removal poses and the attachment preparing pose, attaching pose, moving-away pose of the set of workpiece-attachment poses, are each set in accordance with the procedure shown in FIGS. 6 to 8.

Here, the setting procedure shown in FIGS. 6 to 8 is described with the removal preparing pose as an example. Note that the automatic guided vehicle 35 has been moved to an ideal operation position with respect to the machine tool 10 (step S1) and this operation position has been stored as a provisional operation position into the moving position storage 42 (step S2). First, the robot 25 is brought into the attachment preparing pose (step S3), and data on this pose is stored as a provisional operating pose into the operating pose storage 43 (step S4).

Subsequently, the hand 29 is moved in the plus and minus directions in each of the X-axis and Y-axis as movement axes for the automatic guided vehicle 35 (step S5) and, in each movement direction, it is confirmed whether a movable amount of the hand 29 exceeds a positioning error amount of the automatic guided vehicle 35 (step S6). Note that the positioning error amount of the automatic guided vehicle 35 is obtained empirically in advance.

When the movable amount of the hand 29 exceeds the positioning error amount of the automatic guided vehicle 35 in all of the movement directions, the provisional operation position stored in the moving position storage 42 is stored as a definitive target operation position into the moving position storage 42 (step S7), and the pose data for the attachment preparing pose stored as the provisional operating pose in the operating pose storage 43 is stored as a definitive target operating pose into the operating pose storage 43 (step S8). Thereafter, the teaching operation for the removal preparing pose is ended.

Figure 9:
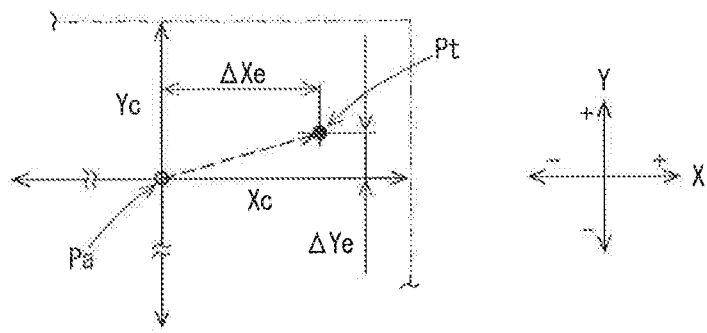
FIG. 9 is an illustrative diagram for explaining a problem in the conventional setting method.
Figure 10:
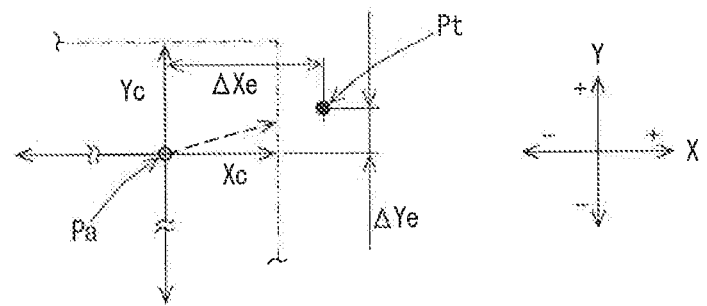
FIG. 10 is an illustrative diagram for explaining the problem in the conventional setting method.

As has been explained on the basis of FIGS. 9 and 10, when both of the positioning error amounts $\Delta Xe$, $\Delta Ye$ of the automatic guided vehicle 35 are smaller than the movable distances Xc, Yc in the X-axis direction and the Y-axis direction of the distal end of the hand 29 with respect to the actual operating position Pa, i.e., when the reference position Pt as a position to which the distal end of the hand 29 has to be moved by compensation is situated within the movable area of the distal end of the hand 29 that is indicated by the dashed and double-dotted lines, the actual operating position Pa of the distal end of the hand 29 can be compensated to the reference position Pt.

On the other hand, when at least one of the positioning error amounts $\Delta xe$, $\Delta Ye$ of the automatic guided vehicle 35 exceeds the movable distances Xc, Yc in the X-axis direction and the Y-axis direction of the robot end with respect to the actual operating position Pa as shown in FIG. 10 (FIG. 10 shows the case of $\Delta Xe > Xc$), i.e., when the reference position Pt as a position to which the robot end has to be moved by compensation is situated out of the movable area of the robot end that is indicated by the dashed and double-dotted lines, the actual operating position Pa of the robot end cannot be compensated to the reference position Pt. Therefore, in the case shown in FIG. 10, the operating pose of the robot 25 cannot be compensated; consequently, the system 1 is brought into an alarm state and shut down.

Accordingly, in this setting method, when the movable amount of the hand 29 exceeds the positioning error amount of the automatic guided vehicle 35 in both of the movement directions in the X-axis and the Y-axis, the pose data for the pose of the robot 25 is stored as a definitive target operating pose for the attachment preparing pose into the operating pose storage 43 since it is possible to compensate a position error of the hand 29 occurring due to a positioning error of the automatic guided vehicle 35 in an automatic operation to be carried out afterwards.

On the other hand, when it is confirmed in the step S6 that the movable amount of the hand 29 is smaller than the positioning error amount of the automatic guided vehicle 35 in any of the movement directions, the provisionally set pose of the robot 25 is reset since there is a possibility that it is impossible to compensate a position error of the hand 29 occurring due to a positioning error of the automatic guided vehicle 35 in an automatic operation to be carried out afterwards.

Specifically, the robot 25 as a whole is first rotated by a predetermined amount about the Z-axis (step S9). Subsequently, the robot 25 is adjusted into an ideal attachment preparing pose (step S10), and the pose data stored as the provisional operating pose in the operating pose storage 43 is updated with data on the adjusted pose (step S11). Note that the amount of rotation of the robot 25 is a value estimated based on the movement axis the movable amount of the hand 29 in which is smaller than the positioning error amount of the automatic guided vehicle 35 and the difference between the movable amount and the positioning error amount, which is appropriately set based on the operator's empirical knowledge.

Subsequently, similarly to the above, the hand 29 is moved to the plus and minus directions in each of the X-axis and Y-axis (step S12), and, in each movement direction, it is confirmed whether the movable amount of the hand 29 exceeds the positioning error amount of the automatic guided vehicle 35 (step S13). When the movable amount of the hand 29 exceeds the positioning error amount of the automatic guided vehicle 35 in all of the movement directions, the provisional operation position stored in the moving position storage 42 is stored as a definitive target operation position into the moving position storage 42 (step S14), and the pose data for the attachment preparing pose stored as the provisional operating pose in the operating pose storage 43 is stored as a definitive target operating pose into the operating pose storage 43 (step S15). Thereafter, the teaching operation for the removal preparing pose is ended.

On the other hand, when it is confirmed in the step S13 that the movable amount of the hand 29 is smaller than the positioning error amount of the automatic guided vehicle 35 in any of the movement directions, the provisionally set pose of the robot 25 is reset again since there is a possibility that it is impossible to compensate a position error of the hand 29 occurring due to a positioning error of the automatic guided vehicle 35 in an automatic operation to be carried out afterwards.

Specifically, the automatic guided vehicle 35 is first moved by an amount greater than the amount of insufficiency in the movement direction and axis the movable amount of the hand 29 in which is smaller than the positioning error amount of the automatic guided vehicle 35 (step S16), and the position data stored as the provisional operation position with respect to the machine tool 10 in the moving position storage 42 is updated with the position of the moved automatic guided vehicle 35 (step S17).

Subsequently, similarly to the above, the robot 25 is adjusted into the ideal attachment preparing pose (step S18), and the pose data stored as the provisional operating pose in the operating pose storage 43 is updated with data on the adjusted pose (step S19).

Subsequently, the hand 29 is moved in the plus and minus directions in each of the X-axis and Y-axis (step S20), and, in each movement direction, it is confirmed whether the movable amount of the hand 29 exceeds the positioning error amount of the automatic guided vehicle 35 (step S21). When the movable amount of the hand 29 exceeds the positioning error amount of the automatic guided vehicle 35 in all of the movement directions, the operation position stored as the provisional operation position in the moving position storage 42 is stored as a definitive target operation position into the moving position storage 42 (step S22) and the pose data for the attachment preparing pose stored as the provisional operating pose in the operating pose storage 43 is stored as a definitive target operating pose into the operating pose storage 43 (step S23). Thereafter, the teaching operation for the removal preparing pose is ended.

On the other hand, when it is confirmed in the step S21 that the movable amount of the hand 29 is smaller than the positioning error amount of the automatic guided vehicle 35 in any of the movement directions, the teaching operation is ended since it is impossible to set the operating pose by the teaching operation. In this case, the teaching operation is carried out again after the cause of the impossibility is found and suitable measures are taken.

Note that, when the automatic guided vehicle 35 is moved in the step S16, operating poses of the robot 25 already set with the automatic guided vehicle 35 at the previous position are changed. Therefore, it is necessary to reset the already set operating poses of the robot 25, even though it is burdensome to do so.

In accordance with the above-described procedure, the removal preparing pose, gripping pose, and pulling pose for the workpiece removal and the attachment preparing pose, attaching pose, and moving-away pose of the set of workpiece-attachment poses of the robot 25 are each set by the teaching operation.

After the operation positions of the automatic guided vehicle 35 and the operating poses of the robot 25 are set and stored into the moving position storage 42 and the operating pose storage 43 by the teaching operation, unmanned and automated production is carried out in the manner described below.

That is to say, the automatic-operation program stored in the operation program storage 41 is executed under control by the automatic-operation control unit 47 of the controller 40, so that, for example, the automatic guided vehicle 35 and the robot 25 are operated in the following manner in accordance with the automatic-operation program.

First, the automatic guided vehicle 35 is moved to the operation position set with respect to the machine tool 10 and the robot 25 is brought into the operation starting pose for the workpiece removal. At this time, the machine tool 10 has finished a predetermined machining operation, a door cover thereof has been opened so that the robot 25 can enter the machining area, and the support bar 15 of the tool presetter 13 has been moved into the machining area upon receipt of a command from the automatic-operation control unit 47.

Subsequently, the robot 25 is brought into the image capturing pose and the camera 31 captures an image of the identification figure arranged on the support bar 15. Once the camera 31 captures the image of the identification figure, the compensation amount calculator 50 estimates positional error amounts $\Delta x$, $\Delta y$ and a rotational error amount $\Delta rz$ between the current image capturing pose of the robot 25 and the image capturing pose of the robot 25 in the teaching operation based on the captured image of the identification figure and the reference image stored in the reference image storage 45. Based on the estimated error amounts, the compensation amount calculator 50 calculates compensation amounts for the subsequent operating poses of the set of workpiece-removal poses of the robot 25.

Based on the compensation amounts calculated by the compensation amount calculator 50, the automatic-operation control unit 47 compensates the subsequent operating poses, i.e., the removal preparing pose, gripping pose, pulling pose, and operation finishing pose, of the set of workpiece-removal poses so as to cause the hand 29 to grip a machined workpiece W' clamped by the chuck 12 of the machine tool 10 and remove the machined workpiece W' from the machine tool 10.

Note that the position of the hand 29 in each of the target operating poses for the removal preparing pose, gripping pose, and pulling pose of the robot 25 can be moved beyond the positioning error amounts in the X-axis and the Y-axis of the automatic guided vehicle 35. In other words, even if positioning errors occur in the X-axis and Y-axis directions when the automatic guided vehicle 35 is moved to the target operation position in the automatic operation, it is possible to move the hand 29 by compensation amounts in the X-axis and Y-axis directions set based on the positioning errors when bringing the robot 25 into each target operating pose. Therefore, the actual operating poses of the robot 25 are reliably compensated to their respective target operating poses based on the positioning errors of the automatic guided vehicle 35.

Subsequently, the automatic-operation control unit 47 moves the automatic guided vehicle 35 to the operation position set with respect to the product storage 21 and brings the robot 25 in sequence into the storage starting pose for starting an operation with respect to the product storage 21, the storing poses for storing the machined workpiece gripped by the hand 29 into the product storage 21, and the storage finishing pose for finishing the storage. Thereby, the machined workpiece gripped by the hand 29 is stored into the product storage 21.

Subsequently, the automatic-operation control unit 47 moves the automatic guided vehicle 35 to the operation position set with respect to the material storage 20 and brings the robot 25 in sequence into the extraction starting pose for starting an operation with respect to the material storage 20, the extracting poses for causing the hand 29 to grip an unmachined workpiece stored in the material storage 20 and extract the unmachined workpiece from the material storage 20, and the extraction finishing pose for finishing the extraction. Thereby, an unmachined workpiece is gripped by the hand 29.

Subsequently, the automatic-operation control unit 47 moves the automatic guided vehicle 35 to the operation position set with respect to the machine tool 10 again and brings the robot 25 into the operation starting pose of the workpiece attachment. Subsequently, the automatic-operation control unit 47 brings the robot 25 into the image capturing pose and causes the camera 31 to capture an image of the identification figure arranged on the support bar 15. Once the camera 31 captures the image of the identification figure, the compensation amount calculator 50 estimates positional error amounts Δx, Δy and a rotational error amount Δrz between the current image capturing pose of the robot 25 and the image capturing pose of the robot 25 in the teaching operation based on the captured image of the identification figure and the reference image stored in the reference image storage 45. Based on the estimated error amounts, the compensation amount calculator 50 calculates compensation amounts for the subsequent operating poses of the set of workpiece-attachment poses of the robot 25.

Subsequently, based on the compensation amounts calculated by the compensation amount calculator 50, the automatic-operation control unit 47 compensates the position of the hand 29 and the rotational position about the Z-axis of the hand 29 in each of the subsequent operating poses, i.e., the attachment preparing pose, attaching pose, moving-away pose, and operation finishing pose, of the set of workpiece-attachment poses of the robot 25 so as to cause the robot 25 to attach the unmachined workpiece W gripped by the hand 29 to the chuck 12 of the machine tool 10 and then move out of the machine tool 10.

Similarly to the above, the position of the hand 29 in each of the target operating poses for the attachment preparing pose, attaching pose, and moving-away pose of the robot 25 can be moved beyond the positioning error amounts in the X-axis and the Y-axis of the automatic guided vehicle 35. In other words, even if positioning errors occur in the X-axis and Y-axis directions when the automatic guided vehicle 35 is moved to the target operation position in the automatic operation, it is possible to move the hand 29 by compensation amounts in the X-axis and Y-axis directions set based on the positioning errors when bringing the robot 25 into each target operating pose. Therefore, the actual operating poses of the robot 25 are reliably compensated to their respective target operating poses based on the positioning errors of the automatic guided vehicle 35.

Thereafter, the automatic-operation control unit 47 transmits a machining start command to the machine tool 10 to cause the machine tool 10 to perform a machining operation. Further, the automatic-operation control unit 47 transmits a chuck close command to the machine tool 10 after bringing the robot 25 into the attaching pose, whereby the chuck 12 is closed so that the unmachined workpiece W is clamped by the chuck 12.

In the system 1 according to this embodiment, unmanned and automated production is continuously performed by repeating the above-described procedure.

As described above, in setting the poses of the robot 25 by the teaching operation according to this embodiment, the target operating poses for the operating poses the position of the hand 29 in which is to be compensated, i.e., the removal preparing pose, gripping pose, and pulling pose for the workpiece removal and the attachment preparing pose, attaching pose, and moving-away pose of the set of workpiece-attachment poses, are each set such that the position of the hand 29 can be moved beyond the positioning error amounts in the X-axis and the Y-axis of the automatic guided vehicle 35. Therefore, even if positioning errors occur in the X-axis and Y-axis directions when the automatic guided vehicle 35 is moved to the target operation position in the automatic operation, it is possible to move the hand 29 by compensation amounts in the X-axis and Y-axis directions set based on the positioning errors when bringing the robot 25 into each target operating pose. That is to say, it is possible to reliably compensate the actual operating poses of the robot 25 to their respective target operating poses based on the positioning errors of the automatic guided vehicle 35.

Further, in setting each target operating pose according to this embodiment, when the position of the hand 29 in the target operating pose cannot be moved beyond the positioning error amounts in the X-axis and the Y-axis of the automatic guided vehicle 35, the robot 25 is first rotated about the Z-axis so as to enable the target operating pose to be reset such that the position of the hand 29 can be moved beyond the positioning error amounts in the X-axis and the Y-axis of the automatic guided vehicle 35. The resetting of the target operating pose can be enabled by adjusting the position of the automatic guided vehicle 35 in the X-axis and the Y-axis (step S16); however, adjusting the position of the automatic guided vehicle 35 in the X-axis and the Y-axis changes operating poses of the robot 25 already set with the automatic guided vehicle 35 at the previous position. Consequently, there is the need to reset all the already set operating poses, which is more than slightly burdensome. Accordingly, in this embodiment, before adjusting the position of the automatic guided vehicle 35, the robot 25 is rotated about the Z-axis so as to enable the resetting of the target operating pose. This process does not affect the already set target operating poses, that is to say, there is no need to reset the already set target operating poses. Therefore, resetting of the current target operating pose is carried out efficiently.

Above has been described an embodiment of the present invention. However, it should be noted that the present invention is not limited to the above-described embodiment and can be implemented in other manners.

For example, in setting each target operating pose of the robot 25 according to the above-described embodiment, when the position of the hand 29 cannot be moved beyond the positioning error amounts in the X-axis and the Y-axis of the automatic guided vehicle 35, the steps S9 to S15, where a correction step of rotating the robot 25 about the Z-axis is performed and then the target operating pose is reset, are carried out. If the position of the hand 29 still cannot be moved beyond the positioning error amounts in the X-axis and the Y-axis of the automatic guided vehicle 35 even after the steps S9 to S15 are carried out, the steps S16 to S23, where another correction step of adjusting the position of the automatic guided vehicle 35 is performed and then the target operating pose is reset, are carried out. Thus, resetting of the target operating pose take place in two phases. However, the present invention is not limited to this configuration. Either the resetting in the steps S9 to S15 or the resetting in the steps S16 to S23, but not both, may be carried out. Alternatively, it is possible to repeat the steps S1 to S8 instead of performing the correction steps.

Further, the confirmation in the steps S6, S13, and S21 in the above-described embodiment may be carried out by an appropriate processing unit provided in the controller 40. In this case, the processing unit may be further configured to display the confirmation results on the display of the operation panel 37. This enables the operator to perform the subsequent steps in accordance with the confirmation results displayed on the display. Further, in this case, the steps S7 and S8, the steps S14 and S15, and the steps S22 and S23 may be performed by the processing unit.

Further, in another configuration, the amounts of movement of the hand 29 in the steps S5, S12, and S20 and the positioning error amounts of the automatic guided vehicle 35 may be displayed on the display of the operation panel 37 by an appropriate processing unit provided in the controller 40 so that the operator can make the judgments in the steps S6, S13, and S21 based on the information displayed on the display. In this case, an enter button may be displayed on the display so that the steps S7 and S8, the steps S14 and S15, and the steps S22 and S23 are performed by the processing unit when the operator presses the enter button.

Further, the three-dimensional space in the above-described embodiment where the automatic guided vehicle 35 and the robot 25 operate is preferably defined by the X-axis and the Y-axis orthogonal to each other in a horizontal plane and the Z-axis set vertically and orthogonal to the X-axis and the Y-axis. The present invention is not limited to this three-dimensional space. The X-axis and the Y-axis only need to intersect each other in a predetermined plane. The Z-axis only needs to intersect the X-axis and the Y-axis and does not need to be set vertically.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 System
10 Machine tool
11 Spindle
12 Chuck
13 Tool presetter
14 Contactor
15 Support bar
16 Display board
20 Material storage
21 Product storage
25 Robot
29 Hand
31 Camera
35 Automatic guided vehicle
37 Operation panel
40 Controller
41 Operation program storage
42 Moving position storage
43 Operating pose storage
44 Map information storage
45 Reference image storage
46 Manual-operation control unit
47 Automatic-operation control unit
48 Map information generator
49 Position recognition unit
50 Compensation amount calculator
51 Input and output interface
W Unmachined workpiece
W' Machined workpiece

The invention claimed is:

1. A setting method of setting a target operating pose of a robot and a target operation position of a transportation device in a three-dimensional space by a manual teaching operation in a robot system, the robot system including: the robot having an acting part acting on a target object; the transportation device having the robot mounted thereon and moving to a set operation position; and a controller controlling operations of the robot and transportation device, the three-dimensional space being formed by a first axis, a second axis, and a third axis, the first axis and the second axis being orthogonal to each other in a horizontal plane, the third axis extending vertically and being orthogonal to the first axis and the second axis, the setting method comprising in sequence:
a first step of moving the transportation device to a position to be set as a predetermined operation position in a plane formed by the first axis and the second axis, and then storing the operation position as a provisional operation position;
a second step of operating the robot in the three-dimensional space with the transportation device stopped at the operation position to bring the robot into a predetermined operating pose, and then storing the operating pose as a provisional operating pose;
a third step of moving the acting part along the first axis and along the second axis by changing a pose of the robot with the transportation device at the provisional operation position and the robot in the provisional operating pose to confirm whether movable amounts in the first axis direction and the second axis direction of the acting part exceed previously obtained positioning error amounts in the first axis and the second axis of the transportation device; and
a fourth step of, when both of the movable amounts in the first axis direction and the second axis direction of the acting part exceed the positioning error amounts in the first axis and the second axis of the transportation device, storing the provisional operation position as the target operation position and storing the provisional operating pose as the target operating pose.

2. The setting method according to claim 1, wherein when either one of the movable amounts in the first axis direction and the second axis direction does not exceed a corresponding one of the positioning error amounts in the first axis and the second axis in the fourth step, after the fourth step, a correction step of rotating the robot as a whole by a predetermined angle about the third axis is performed, and thereafter, the second through fourth steps are re-performed in sequence.

3. The setting method according to claim 1, wherein when either one of the movable amounts in the first axis direction and the second axis direction does not exceed a corresponding one of the positioning error amounts in the first axis and the second axis in the fourth step, after the fourth step, a correction step of moving the transportation device by a distance greater than an amount of insufficiency in the axis direction the movable amount in which does not exceed the corresponding positioning error amount is performed, and thereafter, the second through fourth steps are re-performed in sequence.

4. The setting method according to claim 1, wherein:

when either one of the movable amounts in the first axis direction and the second axis direction does not exceed a corresponding one of the positioning error amounts in the first axis and the second axis in the fourth step, after the fourth step, a first correction step of rotating the robot as a whole by a predetermined angle about the third axis is performed, and thereafter, the second through fourth steps are re-performed in sequence; and when either one of the movable amounts in the first axis direction and the second axis direction does not exceed a corresponding one of the positioning error amounts in the first axis and the second axis in the re-performed fourth step, after the re-performed fourth step, a second correction step of moving the transportation device by a distance greater than an amount of insufficiency in the axis direction the movable amount in which does not exceed the corresponding positioning error amount is performed, and thereafter, the second through fourth steps are re-performed in sequence again.

5. A setting method of setting a target operating pose of a robot and a target operation position of a transportation device in a three-dimensional space by a manual teaching operation in a robot system, the robot system including: the robot having an acting part acting on a target object; the transportation device having the robot mounted thereon and moving to a set operation position; and a controller controlling operations of the robot and transportation device, the three-dimensional space being formed by a first axis, a second axis, and a third axis, the first axis and the second axis intersecting each other in a plane, the third axis intersecting the first axis and the second axis, the setting method comprising in sequence:

a first step of moving the transportation device to a position to be set as a predetermined operation position in a plane formed by the first axis and the second axis, and then storing the operation position as a provisional operation position;

a second step of operating the robot in the three-dimensional space with the transportation device stopped at the operation position to bring the robot into a predetermined operating pose, and then storing the operating pose as a provisional operating pose;

a third step of moving the acting part along the first axis and along the second axis by changing a pose of the robot with the transportation device at the provisional operation position and the robot in the provisional operating pose to confirm whether movable amounts in the first axis direction and the second axis direction of the acting part exceed previously obtained positioning error amounts in the first axis and the second axis of the transportation device; and a fourth step of, when both of the movable amounts in the first axis direction and the second axis direction of the acting part exceed the positioning error amounts in the first axis and the second axis of the transportation device, storing the provisional operation position as the target operation position and storing the provisional operating pose as the target operating pose.

* * * * *